United States Patent [19]

Marchant et al.

[11] 4,345,173
[45] Aug. 17, 1982

[54] METHOD OF GENERATING ELECTRICITY USING AN ENDOTHERMIC COAL GASIFIER AND MHD GENERATOR

[75] Inventors: David D. Marchant; John M. Lytle, both of Richland, Wash.

[73] Assignee: The United States of America as represented by the United States Department of Energy, Washington, D.C.

[21] Appl. No.: 177,327

[22] Filed: Aug. 12, 1980

[51] Int. Cl.³ ............................................. H02N 4/02
[52] U.S. Cl. ........................................ 310/11; 48/210
[58] Field of Search ............................ 310/11; 48/210

[56] References Cited

U.S. PATENT DOCUMENTS 4,282,449  8/1981  Bozzuto ................................ 310/11

Primary Examiner—Donovan F. Duggan
Attorney, Agent, or Firm—Hugh W. Glenn; Robert J. Fisher; Richard G. Besha

[57] ABSTRACT

A system and method of generating electrical power wherein a mixture of carbonaceous material and water is heated to initiate and sustain the endothermic reaction of carbon and water thereby providing a gasified stream containing carbon monoxide, hydrogen and nitrogen and waste streams of hydrogen sulfide and ash. The gasified stream and an ionizing seed material and pressurized air from a preheater go to a burner for producing ionized combustion gases having a temperature of about 5000° to about 6000° F. which are accelerated to a velocity of about 1000 meters per second and passed through an MHD generator to generate DC power and thereafter through a diffuser to reduce the velocity. The gases from the diffuser go to an afterburner and from there in heat exchange relationship with the gasifier to provide heat to sustain the endothermic reaction of carbon and water and with the preheater to preheat the air prior to combustion with the gasified stream. Energy from the afterburner can also be used to energize other parts of the system.

18 Claims, 1 Drawing Figure

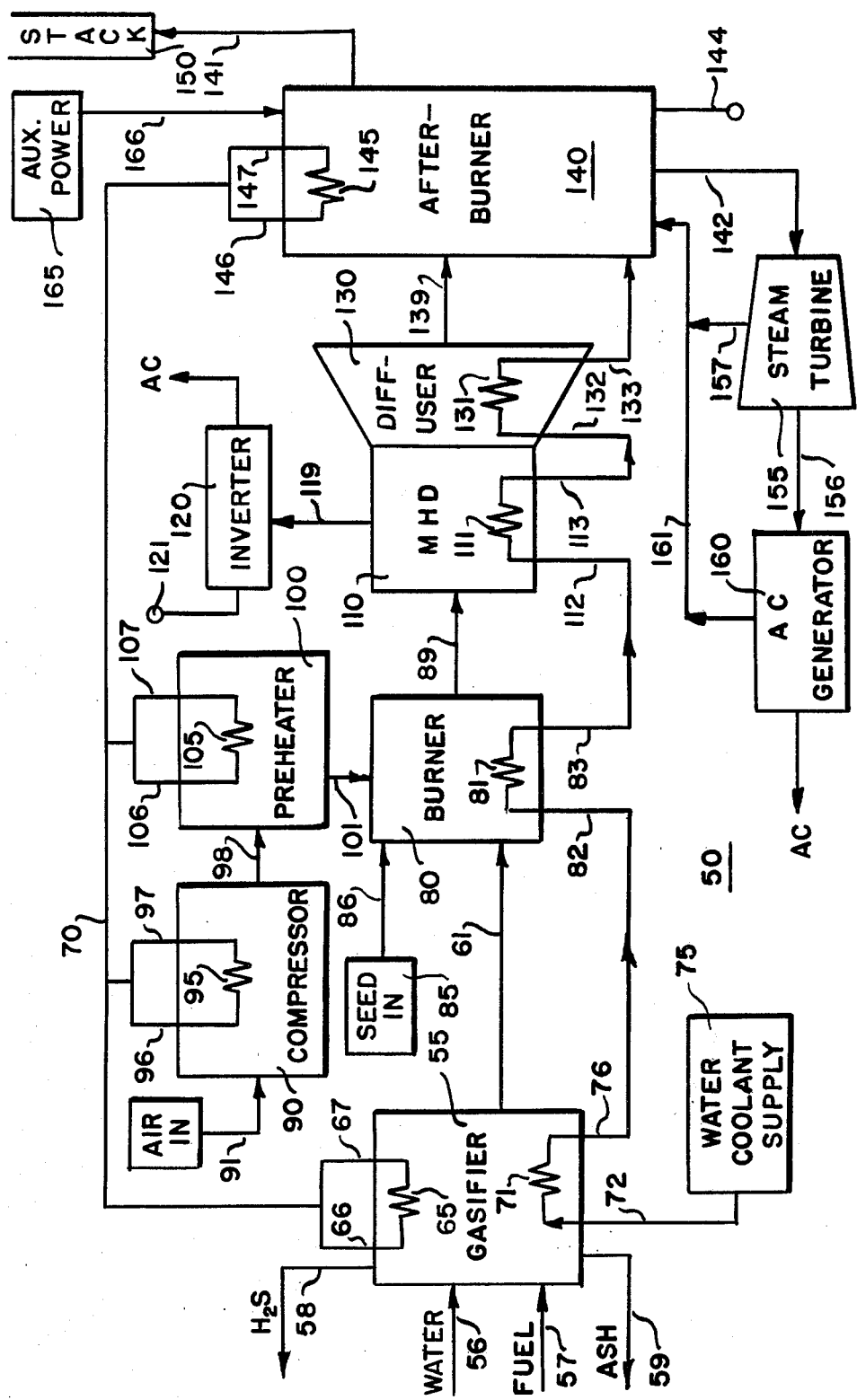

METHOD OF GENERATING ELECTRICITY USING AN ENDOTHERMIC COAL GASIFIER AND MHD GENERATOR

CONTRACTURAL ORIGIN OF THE INVENTION

The invention described herein was made in the course of, or under, a contract with the U.S. DEPARTMENT OF ENERGY.

BACKGROUND OF THE INVENTION

The development of the magnetohydrodynamic (MHD) generator has been considered important because of several advantages. These include a low capital cost, greater efficiency of heat conversion to electrical energy and rapid start-up. The development of the MHD generator has been hampered by several problems, especially in the case of coal combustion. Among these problems are the effect of ash on the process equipment, the removal of the ash and separation of the ash or coal slag from the seed. Low combustion temperatures which require the necessity of preheating air to the burner and the low overall MHD efficiency due to the high energy content of the effluent gases from the MHD generator pose additional problems.

In general terms, MHD generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes in the generator. The gas may exhaust to a sink which may simply be the atmosphere; or, in a more sophisticated system, the gas may exhaust to a recovery system including pumping mechanism for returning the gas to the source.

Several different gases may be used; the gas may be products of combustion, or may comprise inert gases such as helium or argon. In open systems, such as those in which the gases are not recycled after passing through the power plant, products of combustion are normally used. In closed systems, in which the gases are recycled, it is feasible to use relatively expensive gases, such as helium and argon. To promote electrical conductivity, the gases are heated to a high temperature; conductivity is also increased by the addition to the gases of a substance that ionizes readily at the operating temperatures of the generator. Regardless of the gas used, the gas includes a mixure of electrons, positive ions and neutral atoms which, for convenience, is usually termed "plasma".

The temperature of the plasma is highly significant, not only to the overall efficiency of the system but also to the design of the MHD generator. With a higher temperature available at the inlet of the generator, a larger isentropic drop can be developed as the plasma expands through the generator, resulting in an improved plant efficiency. Because the electrical conductivity of the plasma increases as the temperature increases, it is possible to generate a given amount of power in a relatively smaller generator and employ a smaller magnetic field than would otherwise be possible with employment of increased temperatures. The increased efficiency of the MHD system, considerably above that of conventional stream turbine plants, coupled with the absence of hot moving parts in the generator suggest that in time MHD power plants will replace or substantially supplant power generating systems of conventional design.

Some of the problems endemic to MHD systems, even after the substantial amount of development work over the past several years includes the loss of high energy gas from the MHD generator as well as the necessity to preheat air in order to obtain the requisite high temperatures at the generator inlet and to dry and preheat the fuel, particularly where coal is employed.

Representative literature relating to MHD generating systems includes U.S. Pat. No. 3,414,744 issued Dec. 3, 1968 to Petrick for Magnetohydrodynamic Generator which discloses the use of an MHD generator using NaK coolant from a nuclear reactor.

U.S. Pat. No. 3,531,665 issued Sept. 29, 1970 to Rosa for Coal Preheating System for Magnetohydrodynamic Devices which discloses mechanism for preheating pulverized coal with MHD off gas.

U.S. Pat. No. 3,720,850 issued Mar. 13, 1973 to Way for Magnetohydrodynamic Power System With Semi-Closed Cycle shows the recycling of MHD off gases to the inlet side of the MHD generator.

U.S. Pat. No. 3,873,845 issued Mar. 25, 1975 to Osthaus for Method Of Producing Electric Energy Including Coal Gasification discloses a process and system for gasifying coal dust with air heated to 1500° C., the combustion gas therefrom being cooled to 150° C. thereby producing high pressure steam for producing electricity.

U.S. Pat. No. 3,895,243 issued July 15, 1975 to Amend et al. for Method And Means Of Generating Power From Fossil Fuels With A Combined Plasma And Liquid-Metal MHD Cycle discloses a process for utilizing the waste heat from a fossil fuel MHD generator to heat a liquid-metal MHD generator. Air is preheated by heat exchange with the walls of the combustion chamber for the MHD generator.

U.S. Pat. No. 4,064,222 issued Dec. 20, 1977 to Bretz for Nitrogen Fixation And Molecular Magneto Hydrodynamic Generator Using A Coal Gasification Gas Stream discloses a coal gasifier using coal and oxygen to produce off gas which is burned with air and fed to a MHD generator followed by adiabatic expansion to fix the nitrogen oxides.

U.S. Pat. No. 4,107,557 issued Aug. 15, 1978 to Shepard for Sulfur-Fueled Magnetohydrodynamic Power Generation discloses a closed cycle MHD generator using sulfur and oxgen to produce a flame temperature of greater than 8000° F. to the MHD generator.

SUMMARY OF THE INVENTION

This invention relates to a method and system of generating electrical power in which energy from the MHD effluent is utilized to increase system efficiency.

An important object of the present inventin is to provide a method of generating electrical power, comprising introducing carbonaceous material and water to a gasifier, initiating and sustaining the endothermic reaction of carbon and water thereby providing a gasified stream containing carbon monoxide, hydrogen and nitrogen, passing the gasified stream and an ionizing seed material to a burner and there contacting the gasified stream with preheated air, either ambient or enriched, to burn the gasified stream thereby producing ionized combustion gas having a temperature greater than about 3600° F., accelerating the ionized combustion gas to a velocity greater than about 400 meters per second, passing the accelerated ionized combustion gas through an MHD generator to generate DC power and thereafter through a diffuser to reduce the gas velocity, and passing the gas from the diffuser in heat exchange relationship with the gasifier to provide heat to sustain the endothermic reaction of carbon and water.

Another object of the present invention is to provide a method of generating electrical power, comprising introducing carbonaceous material and water to a gasifier, heating mixture of carbonaceous material and water to initiate and sustain the endothermic reaction of carbon and water thereby providing a gasified stream containing carbon monoxide, hydrogen and nitrogen, passing the gasified stream and an ionizing seed material and air from a preheater to a burner to burn the gasified stream thereby producing ionized combustion gas having a temperature greater than about 3600° F., accelerating the ionized combustion gas to a velocity greater than about 400 meters per second, passing the accelerated ionized combustion gas through an MHD generator to generate DC power and thereafter through a diffuser to reduce the gas velocity, passing the gas from the diffuser to an afterburner to burn same, and passing the gas from the afterburner in heat exchange relationship with the gasifier to provide heat to sustain the endothermic reaction of carbon and water and with the preheater to preheat the air prior to the combustion with the gasified stream.

A still further object of the present invention is to provide a method of generating electrical power, comprising, introducing coal and water to a gasifier, heating the mixture of coal and water to initiate and sustain the endothermic reaction of carbon and water thereby providing a gasified stream containing carbon monoxide, hydrogen and nitrogen, providing a compressor for compressing air and a preheater for preheating air, passing the gasified stream and an ionizing seed material and compressed preheated air having a temperature of up to about 3000° F. and a pressure of up to about 150 pounds per square inch to a burner to burn the gasified stream thereby producing ionized combustion gas having a temperature in the range of from about 3600° F. to about 6000° F., accelerating the ionized combustion gas to a velocity in the range of from about 400 meters per second to about 1100 meters per second, passing the accelerated ionized combustion gas through an MHD generator to generate DC power and thereafter through a diffuser to reduce the gas velocity, passing the gas from the diffuser to an afterburner to burn same, and a passing the gas from the afterburner in heat exchanger relationship with the gasifier to provide heat to sustain the endothermic reaction of carbon and water in heat exchange relationship with the preheater to provide heat for preheating air and extracting energy from the gas from the afterburner for energizing the compressor.

These and other objects of the present invention may more readily be understood by reference to the following specification taken in conjunction with the accompanying drawing, in which:

DESCRIPTION OF THE FIGURE

The single drawing FIGURE is a schematic diagram of a system for practicing the method of the invention.

DETAILED DESCRIPTION OF THE INVENTION

Referring now to the drawing, there is disclosed a system 50 which includes a steam gasifier 55 having connected thereto a water inlet 56 and a fuel inlet 57. The fuel which is contemplated for use with the system 50 of the present invention includes any carbonaceous material such as coal, oil shale, tar sands, forest waste material, farm and municipal waste material, wood, lignite, peat, brown coal and the like. For simplicity sake, coal will be the assumed fuel. Although the system 50 is specifically designed to accommodate the endothermic reaction of carbon and water producing carbon monoxide and hydrogen, the system can accommodate up to about 20 volume percent oxygen supplied by air and still retain some advantages hereinafter described. The preferred souce of oxygen is water and water is preferred to air. It is understood, however, that all references to water in the foregoing description include air.

The steam gasifier 55 is the situs for the endothermic reaction resulting in a mixture of gaseous carbon monoxide, hydrogen, nitrogen and hydrogen sulfide, the hydrogen sulfide resulting from the presence of sulfur may be removed from the system by techniques well known in the art. Ash produced as a result of the endothermic reaction settles by gravity and is removed through a bottoms outlet 59 along with any coal slag. The gaseous product of carbon monoxide, hydrogen and nitrogen leaves the steam gasifier 55 through an outlet conduit 61. Heat to initiate and sustain the endothermic reaction in the steam gasifier 55 is provided by passing MHD off gas, as will be explained through a heater 65 having an inlet 66 and an outlet 67, both connected to a conduit 70. Conduit 70 is schematically drawn as a single line and represents mechanism for transferring energy from the MHD off gas to several of the system 50 components. No specific order in energy transfer is intended by the drawing nor is the energy transfer limited to heat exchange.

The steam gasifier 55 is required to be cooled and there is included in the system 50 a water coolant supply 75 connected by an inlet 72 to a cooling coil 71 in heat exchange relationship with the gasifier, leaving the coil 71 through an outlet 76.

A burner 80 receives the gasifier product through the conduit 61 and there comingles same with hot compressed air received from both an air compressor 90 and an air preheater 100. The air compressor 90 has an air inlet 91 and an outlet 98 in fluid communication with the air preheater 100. Energy is supplied to the air compressor 90 by mechanism 95 suitably connected to the line 70 by inlet 96 and outlet 97. The air preheater 100 has a heater 105 having an inlet 106 and an outlet 107, both also connected to the conduit 70. Air from the air preheater 100 exits through a conduit 101 in fluid communication with the burner 80 where the preheated air and the off gas from the steam gasifier 55 are combined and burned to produce combustion gas which leaves the burner 80 by a conduit 89. A cooling coil 81 having an inlet 82 connected to the outlet 76 of the coil 71 and an outlet conduit 83 serve to cool the burner 80 walls and to preserve the physical integrity thereof.

The combustion gas from the burner 80 flows through the conduit 89 and through a nozzle (not shown) in which the gas is accelerated and then into an MHD generator 110. The MHD generator 110, as is well known in the art, is provided with means for establishing a magnetic field and opposed electrodes for collecting a current generated by the plasma flowing through the magnetic field. The power produced is DC power and is conducted from the MHD generator through a line 119 to an inverter 120. The inverter 120 is an electrical device which converts the DC power to AC power, the inefficiency of the inverter being represented as an energy dump 121.

MHD generator 110 is connected to a diffuser 130 which reduces the velocity of the MHD effluent and conducts same by a conduit 139 to an afterburner 140. Both the MHD generator 110 and the diffuser 130 require cooling and this is provided by means of cooling coils 111 and 131, respectively each having an inlet 112 and 132 and an outlet 113 and 133, the outlet 133 being connected to the afterburner 140 to ransfer the heat energy collected from the gasifier 55, the burner 80, the generator 110 and the diffuser 130.

The afterburner 140 is provided with an air supply (not shown) and there burns the MHD effluent conveyed thereto through the conduit 139. The burned gas in the afterburner 140 is conducted by a conduit 141 to a stack 150 for exhaustion to the atmosphere or to cleanup equipment if necessary. Energy from the afterburner combustion gas is conducted by an outlet conduit 142 to a steam turbine 155 in which the gas is passed in heat exchange relationship with water to provide steam to drive the turbine, the output of which 156 is used to produce AC power from an AC power generator 160. Both the steam turbine 155 and the AC generator 160 have energy therefrom recycled respectively by lines 157 and 161 to the afterburner 140.

Energy transfer mechanism 145 is positioned in the afterburner 140 with inlet line 146 and outlet line 147 thereof being connected to the common conduit 70. The afterburner 140 is connected in energy exchange relationship with the steam gasifier 55, the air compressor 90 and the air preheater 100. Finally, a portion of the energy produced in the system 50 is lost as cooling losses in the afterburner 140 and elsewhere and is represented by a dump 144. An auxiliary power source 165 provides additional energy to the system 150 through a line 166, schematically joining the system 150 by an electrical connector 166 to the afterburner 140.

An example is hereinafter set forth wherein calculated efficiency is 43% based on an input of 286.7 megawatts of chemical energy per hour (hereinafter MWc) and having a net output of 123.6 megawatts of electrical energy per hour (hereinafter MWe). Water is introduced into the system 50 through the line 56 at the flow rate of 46,893 pounds per hour at an ambient temperature of about 80° F. and Montana coal (analysis hereinafter set forth) is introduced into the steam gasifier 55 at a flow rate of 109,847 pounds per hour, the coal having a heat value of 8,920 btu per pound and 286.7 MWc. In order to initiate and sustain the endothermic reaction heretobefore discussed in the steam gasifier 55, energy in the amount of 210.1 megawatts thermal per hour (hereinafter MWt) must be added to the gasifier 55 by the heater 65. The gases leaving the steam gasifier 55 through the outlet conduit 61 leave at a flow rate of 146,186 pounds per hour at a temperature of 1880° F. having an enthalpy of 1,273 btu per pound, and 54.5 MWt and 379.3 MWc.

The hydrogen sulfide and ash leaving the steam gasifier 55 respectively through lines 58 and 59 have flow rates of 989 pounds per hour and 9,565 pounds per hour, respectively, both at a temperature of 1880° F. and at enthalpies of 450 btu per pound and 324 btu per pound, respectively. The combined steams 58 and 59 also have a energy level of 2,8 MWc and 1.0 MWt.

Using Montana coal as basis for calculation, and using a 1 pound sample: carbon content is 0.5211; hydrogen content is 0.0601; sulfur content is 0.0086; nitrogen content is 0.0080; oxygen content is 0.3151, and the ash content is 0.0871. The steam gasification of the above sample of coal on a per pound basis requires 0.379 pounds of oxygen supplied as 0.427 pounds of water per pound of coal. The product from the gasifier 55 leaving through line 61 to the burner 80 includes (on a per pound coal basis) 1.216 pounds carbon monoxide, 0.107 pounds hydrogen gas, 0.009 pounds hydrogen sulfide gas, 0.008 pounds nitrogen gas and 0.087 pounds ash. Both the ash and the hydrogen sulfide are taken out as previously indicated leaving the carbon monoxide, hydrogen and nitrogen to be conveyed to the burner 80.

As indicated, the off gas from the steam gasifier 55 flows through line 61 to the burner 80 at a flow rate of 146,186 pounds per hour at a temperature of 1880° F. and has energy of 54.5 MWt and 379.3 MWc, and potassium carbonate or potassium sulfate seed is introduced to the burner through line 86 at a flow rate of 17,700 pounds per hour.

The burner 80 also receives in addition to the aforementioned gasifier off product preheated air from the air preheater 100. Energy at the rate of 22.3 MWt is used by the air compressor 90 to compress the air therein to 70 psi at a temperature of about 495° F. The flow rate of air leaving the compressor 90 through the line 98 is 754,537 pounds per hour at the aforementioned temperature and pressure, the air having an energy of 22.3 MWt. Energy is added to the air preheater 100 at the rate of 156.1 MWt from the afterburner 140 and the air leaving the preheater is at the same flow rate as the airin, that is, 754,537 pounds per hour and at the same pressure of about 70 psi but the temperature at the outlet is 3,000° F. and at an energy of 178.4 MWt. In the burner 80 the product from the gasifer 55 is burned with the preheated air and combustion gas leaves the burner 80 through line 89 at a flow rate of 918,423 pounds per hour at a temperature of about 5,315° F., the off gases having an energy of about 555 MWt. The burner 80 like other components in the system 50 require cooling coils to maintain the structural integrity thereof, and therefore, energy in the amount of 3.06 MWt is removed by coolant flow through the cooling coils 81.

The combustion gas from the burner 80 is accelerated through a nozzle (not shown) and enters the MHD generator 110 at a velocity of up to 1,100 meters per second thereby generating DC power at the rate of about 94.4 MWe leaving the generator 110 as indicated through the conductor 119 to the inverter 120 for conversion to AC power at the rate of 92.5 MWe, the difference of 1.9 MWt being lost due to the inefficiency of the inverter and being illustrated at 121 in the drawing. The MHD generator 110 as is true with the other components in the system requires cooling, and therefore, energy at the rate of 31.9 MWt is removed by coolant flow through the coils 111.

Off gas from the generator 110 flows through the diffuser 130, whereby the velocity of the MHD effluent leaving the diffuser is about 100 meters per second at a rate of about 918,423 pounds per hour. The temperature of the gas leaving the diffuser 130 is 4,301° F. having an energy of 398.8 MWt, and the energy leaving the diffuser via cooling coil 131 is 29.9 MWt.

The MHD effluent leaving the diffuser 130 is burned in the afterburner 140 and a portion of the energy is recycled to the steam gasifier 55, the air compressor 90 and the preheater 100 to improve the efficiency of the system and to conserve fuel usually necessary to operate the air preheater, the air compressor and provide the energy necessary to initiate and sustain the endothermic reaction in the steam gasifier. Gas from the afterburner 140 leaves through line 141 to the stack 150 at a temperature of about 250° F. and an energy of about 20 MWt. Additionally total cooling losses from the system indicated 144 are at a level of about 143.1 MWt taking into account cooling losses from the steam gasifier 55, burner 80, the MHD generator 110, the diffuser 130 and the afterburner 140. The afterburner itself supplies and additional 26.6 MWt to the combustion of gases therein and a portion of this energy in addition to the energy from the MHD effluent is transmitted via line 142 to the steam turbine 155 andhence to the AC generator 160 for the production of AC power at the rate of 41.2 MWe. Both theAC generator and the steam turbine recycle 9.7 MWe energy to the afterburner 140.

An energy balance for the afterburner 150 is:

| Energy | (MHD effluent) | 398.8 MWt |
|---|---|---|
| Energy | (cooling coils) | 151.6 MWt |
| Energy | (afterburner) | 26.6 MWt |
| Energy | (Auxiliary power added) | 10.1 MWt |
| | Energy In = | 587.1 MWt |
| Energy | (air compressor) | 22.3 MWt |
| Energy | (air preheater) | 156.1 MWt |
| Energy | (steam gasifier) | 210.1 MWt |
| Energy | (stack gases) | 20.0 MWt |
| Energy (Net) | (steam turbine & AC generator) | 41.2 MWt |
| Energy | (cooling losses) | 137.4 MWt |
| | Energy Out = | 587.1 MWt |

The burner 80 and the MHD generator 110 are the core of the system 50. Although the pressure of the gases in the preferred embodiment is about 70 psi, the burner 80 may operate within pressure ranges of from about 20 psi to about 150 psi. If pressures are less than about 20 psi, the powder produced in the MHD generator 110 decreases to an unacceptable level. The power generated in the MHD generator 110 is related to the mass flow rate through the generator and if pressures are less than about 20 psi, the gas density is sufficiently low that the conductivity of the gas decreases as well as the mass flow rate, both resulting in decreased power out of the MHD generator. Pressures in excess of about 150 psi are undesirable because the equipment necessary to accommodate these pressures is more sophisticated and expensive, that is pressure vessel technology is required to handlepressures in excess of about 150 psi and this is unnecessary and therefore an undesirable expense.

Although the preferred embodiment illustrated temperature of the combustion gas from the burner 80 of 5,315° F., the system 50 will accommodate temperatures for the combustion gas from the burner 80 within a range of from about 3600° F. to about 6000° F. Temperatures in excess of 6000° F. require more sophisticated metal technology to accommodate the high temperature while temperatures less than about 3600° f. do not provide good electrical conducting plasma. It is realized, as heretofore stated, that higher gas temperatures are more desirable from an electrical conductivity view point and a power output view, but nevertheless the ranges aforesaid should be maintained.

As is well understood by those skilled in the art, temperature and pressure parameters of the burner 80 are influenced by the temperatures and pressures of the output from both the steam gasifier 55 and the air preheater 100. Nevertheless, each of these components can be operated within said temperature and pressure ranges but a lower temperature in the steam gasifier 55 will require a higher temperature in the air preheater 100 and so on. The steam gasifier 55 may be operated in the temperature range of from about 1300° F. to about 2500° F. Temperatures less than about 1300° F. do not produce a sufficient gasification reaction without a catalyst and therefore are not preferred. The temperature of about 2500° F. is the upper limit because of material handling problems.

The air compressor 65 generally will put out air at a temperature of about 500° F. for a pressure of 70 psi. Both the output temperature and the output pressure of air from the air compressor 65 are interrelated and are generally not individually variable. The air preheater may be operated to produce preheated air having a temperature in the range of from about 500° F. to about 3000° f. Preferably, the higher temperature is utilized in order to require less energy from the burner 80. Where the low temperatures of 500° F. is utilized, then the steam gasifier 55 must be operated at a higher temperature to accommodate for the low preheat temperature. As before stated, there is an interrelationship between the temperature and pressure of the output from the air preheater 100 and the temperature of output from the steam gasifier 55 in order to achieve the desired temperature output from the burner 80.

The seed is an alkali metal salt and preferably potassium sulfate or potassium carbonate and the flow rate of 17,700 pounds per hour is selected to satisfy the parameters of the preferred embodiment, but it is understood that the seed flow rate may be varied within a wide range of parameters necessary to maintain adequate seeding and conductivity of the gas through the MHD generator 110. Because ash is removed from the steam gasifier 55, the ash is not present in the combustion gas produced in the burner 80 and therefore ssed recovery is facilitated and this is a major advantage of the present invention. The combustion gas from the burner 80 consists primarily of carbon dioxide and water with some carbon monoxide being present along with nitrogen. There is substantially no ash nor is there any substantial quantity of hydrogen sulfide, this preferably having been separatedin the steam gasifier 55.

The MHD generator 110 and the diffuser 130 are usually considered as a single unit and the temperature and pressure ranges aforesaid for the burner 80 hold true for the MHD generator and the diffuser. The MHD generator 110 may be operated in conjunction with the nozzle (not shown) to accommodate plasmavelocities in the range of from about 0.4 to about 1.1 mach or from about 400 to about 1100 meters per second. The temperature of the gas leaving the diffuser 130 is about 1000° less than the gas entering the MHD generator 110 orin the preferred embodiment, the temperature of the gas in is about 5,315° F. and the gas out of the diffuser are 4,301° F. With respect to the velocity ranges, velocities of the plasma less than about 400 meters per second result in an unacceptable decrease in the power output since the power output of the generator depends on the mass passing through the generator and the mass epends on the velocity and the gas density. Gas velocities greater than about 1100 meters per second result in instabilities in the plasma which are undesirable and therefore the upper limit is set near 1 mach.

The temperatures and pressures acceptable in the afterburner 140 are the same as those acceptable for the burner 80 and for the same reasons.

There has been provided a method for generating electrical power utilizing a steam gasifier and MHD generator which utilizes energy from the MHD effluent or off gas to maintain the endothermic reaction in the steam gasifier, operate the air preheater and the air compressor. The overall efficiency of the present method is greater than heretofore reported in the literature due to the recycle of energy through the MHD generator via the gasifier, air preheater and compressor. Use of endothermic coal gasification reaction with water or steam rather than oxygen is central to the inventive method, although up to 20 volume percent of oxygen can be accommodated without losing all the advantages of the present system. Another significant advantage of the inventive method is that it is unnecessary to dry fuel or coal prior to introduction to the system, thereby saving energy. Additionally, high moisture fuels such as forest, farm and municipal waste, wood, lignite, peat and brown coal are economical to use in the inventive system since drying is unnecessary. Other fuels such as oil shale and tar sands or mixtures of any of the above named fuels may be used in the system without detracting from any of the advantages thereof.

Because the coal slag is removed in the gasifier and is never transmitted to the MHD generator, separation of the seed material from coal slag or ash is not required and represents a significant saving over prior systems.

While for illustration purposes a steam gasifier has been illustrated herein, it should be understood that other gasifier inputs may include well known materials such as water, carbon dioxide or air.

While there has been described what at present is considered to be the preferred embodiment of the present invention, it will be understood that various modifications and alterations may be made therein without departing from the true scope of the invention, and it is intended to cover in the claims appended hereto all such modifications and alterations.

The embodiments of the invention in which an exclusive property or priviledge is claimed are defined as follows:

1. A method of generating electrical power, comprising: introducing carbonaceous material and water to a gasifier, initiating and sustaining the endothermic reaction of carbon and water in the gasifier thereby providing a gasified stream free of ash containing carbon monoxide, hydrogen and nitrogen, passing the gasified stream and an ionizing seed material to a burner and there contacting the gasified stream with preheated air to burn the gasified stream thereby producing ionized combustion gases having a temperature greater than about 3600° F., accelerating the ionized combustion gases to a velocity greater than about 400 meters per econd, passing the accelerated ionized combustion gases through an MHD generator to generate DC power and thereafter through a diffuser to reduce the gas velocity, and passing the gases from the diffuser in heat exchange relationship with the gasifier to provide heat to sustain the endothermic reaction of carbon and water.

2. The method of claim 1, wherein the mixture in the gasifier is maintained at a temperature in the range of from about 1300° F. to about 2500° F.

3. The method of claim 1, wherein the seed material is potassium sulfate or potassium carbonate.

4. The method of claim 1, wherein the preheated air enters the burner at a pressure in the range of from about 20 psi to about 150 psi.

5. The method of claim 1, wherein the preheated air enters the burner at a temperature in the range of from about 500° F. to about 3000° F.

6. The method of claim 1, wherein the ionized combustion gases leave the burner at a temperature in the range of from about 3600° F. to about 6000° F.

7. The method of claim 1, wherein the ionized combustion gases are accelerated to a velocity in the range of from about 400 meters per second to about 1100 meters per second.

8. The method of claim 1, wherein the entire gaseous stream from the gasifier is passed to the burner.

9. The method of claim 1, wherein the velocity of the gases leaving the diffuser is about 100 meters per second.

10. The method of claim 1, wherein the temperature of the gases leaving the diffuser is about 1000° F. less than the temperature of the gases entering the MHD generator.

11. The method of claim 1, and further comprising passing at least a portion of the gases from the diffuser in heat exchange relationship with water to produce steam for transmittal through a stream turbine to generate AC power.

12. A method of generating electrical power, comprising: introducing carbonaceous material and water to a gasifier, heating the mixture of carbonaceous material and water to initiate and sustain the endothermic reaction of carbon and water thereby providing a gasified stream free of ash containing carbon monoxide, hydrogen and nitrogen, passing the gasified stream and an ionizing seed material and air from a preheater to a burner to burn the gasified stream thereby produding ionized combustion gases having a temperature greater than about 3600° F., accelerating the ionized combustion gases to a velocity greater than about 400 meters per second, passing the accelerated ionized combustion gases through an MHD generator to generate DC power and thereafter through a diffuser to reduce the gas velocity, passing the gases from the diffuser to an afterburner to burn same, and passing the gases from the afterburner in heat exchange relationship with the gasifier to provide heat to sustain the endothermic reaction of carbon and water and with the preheater to preheat the air prior to combustion with the gasified stream.

13. The method of claim 12, wherein the carbonaceous material is selected from the class consisting of coal, oil shale, tar sands, forest waste material, farm and municipal waste material, wood, lignite and peat and mixtures thereof.

14. The method of claim 12, wherein the carbonaceous material is coal.

15. A method of generating electrical power, comprising: introducing coal and water to a gasifier, heating the mixture of coal and water to initiate and sustain the endothermic reaction of carbon and water thereby providing a gasified stream free of ash containing carbon monoxide, hydrogen and nitrogen, providing a compressor for compressing air and a preheater for preheating air, passing substantially the entire gasified stream and an ionizing seed material and compressed preheated air having a temperature of up to about 3000° F. and a pressure of up to about 150 pounds per square inch to a burner to burn the gasified stream thereby producing ionized combustion gases having a temperature in the range of from about 3600° F. to about 6000° F., accelerating the ionized combustion gases to a velocity in the range of from about 400 meters per second to about 1100 meters per second, passing the accelerated ionized combustion gases through an MHD generator to generate DC power and thereafter through a diffuser to reduce the gas velocity, passing the gases from the diffuser to an afterburner to burn same, and passing the gases from the afterburner in heat exchange relationship with the gasifier to provide heat to sustain the endothermic reaction of carbon and water and in heat exchange relationship with the preheater to provide heat for preheating air and extracting energy from the gases from the afterburner for energizing the compressor.

16. The method of claim 15, wherein the coal and water are added to the gasifier at ambient temperatures.

17. The method of claim 15, wherein the gasified stream leaving the gasifier is at a temperature less than about 2000° F. and the air leaving the compressor is at a temperature of about 500° F. and at a pressure of about 70 psi and the air leaving the preheater is at a temperature of about 3000° F., and the ionized combustion gases leave the burner at a temperature in the range of from about 5000° F. to about 5500° F.

18. The method of claim 17, wherein the ionized combustion gases are accelerated to a velocity of about 1100 meters per second and the gases leaving the diffuser have a velocity of about 100 meters per second and a temperature in the range of from about 4000° F. to about 4500° F.

* * * * *